United States Patent
Katsumata et al.

(10) Patent No.: US 8,302,262 B2
(45) Date of Patent: Nov. 6, 2012

(54) HINGE DEVICE OF PLANE DISPLAY

(75) Inventors: Tsutomu Katsumata, Osaka-hu (JP); Takayuki Kaneko, Osaka-hu (JP)

(73) Assignee: Simotec Inc., Osaka-Hu (JP)

( * ) Notice: Subject to any disclaimer, the term of this patent is extended or adjusted under 35 U.S.C. 154(b) by 988 days.

(21) Appl. No.: 12/018,689

(22) Filed: Jan. 23, 2008

(65) Prior Publication Data
US 2009/0184216 A1 Jul. 23, 2009

(51) Int. Cl.
*E05D 7/00* (2006.01)

(52) U.S. Cl. .............. 16/354; 16/308; 16/366; 248/919; 248/923

(58) Field of Classification Search .................... 16/367, 16/366, 302, 308, 354; 248/919–923; 361/679.27, 361/679.22
See application file for complete search history.

(56) References Cited

U.S. PATENT DOCUMENTS

| | | | | |
|---|---|---|---|---|
| 6,532,628 B2 * | 3/2003 | Kim | ................................. | 16/342 |
| 7,213,792 B2 * | 5/2007 | Choi | ........................... | 248/279.1 |
| 7,457,131 B2 * | 11/2008 | Kaneko | ........................... | 361/755 |
| 7,564,682 B2 * | 7/2009 | Liou et al. | ................. | 361/679.22 |
| 7,604,210 B2 * | 10/2009 | Oddsen et al. | ........... | 248/280.11 |
| 7,660,106 B2 * | 2/2010 | Watanabe | ................. | 361/679.27 |

FOREIGN PATENT DOCUMENTS

| JP | 2005208080 A1 | 8/2005 |
|---|---|---|
| JP | 2005300922 A1 | 10/2005 |

* cited by examiner

*Primary Examiner* — William L. Miller
(74) *Attorney, Agent, or Firm* — Browdy and Neimark, PLLC

(57) ABSTRACT

A hinge device of a plane monitor is capable of manually rotating a plane display in lateral horizontal direction, manually inclining (tilting, laying) in longitudinal direction, or manually adjusting the height in vertical direction, being simple in structure and easy in manual operation. The structure includes a mechanism for supporting a plane display in lower part, and rotating it manually in lateral horizontal direction, in which the rotary mechanism in the lateral horizontal direction includes horizontal rotary position holding means, and transmitting means for transmitting rotary motion in lateral horizontal direction of the plane display to the horizontal rotary position holding means.

8 Claims, 10 Drawing Sheets

HINGE DEVICE OF PLANE DISPLAY

TECHNICAL FIELD

The present invention relates to a hinge device of a plane display for manually rotating a plane display such as liquid crystal display or plasma display in lateral horizontal direction, manually inclining (tilting, laying) in longitudinal direction, and manually elevating in vertical direction.

A conventional hinge device of a plane display includes a display support device (see, for example, patent document 1) capable of changing a heavy display panel in its direction of panel surface (horizontal angle, laying angle). Other example is a stand for a display monitor for elevating the display monitor by creating a weak friction when moving up an elevating member by one-way clutch or torque limiter for composing a friction mechanism (see, for example, patent document 2).

Neither of these conventional devices include a function for rotating the plane display manually, promptly and easily in lateral horizontal direction, manually inclining (tilting, laying) in longitudinal direction, or manually elevating in vertical direction.

Patent document 1 Japanese Patent Application Laid-Open No. 2005-208080

Patent document 2 Japanese Patent Application Laid-Open No. 2005-300922

DISCLOSURE OF THE INVENTION

Problem to be Solved by the Invention

It is hence an object of the invention to present a hinge device of a plane display capable of manually rotating a plane display in lateral horizontal direction, or manually inclining (tilting, laying) in longitudinal direction, or manually adjusting the height in vertical direction simultaneously, and manipulating manually easily and in a simple structure.

Means for Solving Problem

The hinge device of a plane display of the invention includes a mechanism for supporting a plane display in lower part, and rotating it manually in lateral horizontal direction, in which the rotary mechanism in lateral horizontal direction includes horizontal rotary position holding means, and transmitting means for transmitting rotary motion in lateral horizontal direction of the plane display to the horizontal rotary position holding means. The horizontal rotary position holding means is rotational friction means. The rotary motion transmitting means includes a working gear rotating in interlock with the horizontal rotary motion of the plane display.

The hinge device includes a mechanism for supporting a plane display in lower part, and tilting it manually in longitudinal direction, in which the tilting mechanism in longitudinal direction includes longitudinal tilting position holding means, and transmitting means for transmitting longitudinal tilting motion of the plane display to the longitudinal tilting position holding means. The longitudinal tilting position holding means is friction means composed of a plurality of friction plates. The transmitting means of longitudinal tilting motion includes a tilting plate interlocking with the longitudinal tilting motion of the plane display, and a horizontal pivot for transmitting the tilting motion of the tilting plate to the longitudinal tilting position holding means. It further includes at least one pair of torsion springs provided on the horizontal pivot, disposed between the tilting plate and lateral rotary plate, and mutually reverse in torsion direction.

The hinge device includes a mechanism for supporting a plane display in lower part, and elevating it manually in vertical direction, in which the elevating mechanism in vertical direction includes elevating position holding means, and transmitting means for transmitting elevating motion of the plane display to the elevating position holding means. The elevating position holding means is rotational friction means. The elevating motion transmitting means includes a display mounting frame attached to the rear side of the plane display, a vertical moving plate attached to the display mounting frame, and a pinion rotatably provided in the vertical moving plate, engaged with a rack provided in a vertical base plate, and coupled to the elevating position holding means

Effects of the Invention

It is an advantage of the hinge device of a plane display of the invention because it is capable of manually rotating a plane display in lateral horizontal direction, or manually inclining (tilting, laying) in longitudinal direction, or manually adjusting the height in vertical direction simultaneously, and hence manipulating manually easily and in a simple structure.

THE BEST MODE FOR CARRYING OUT THE CLAIMED INVENTION

Figure 1:
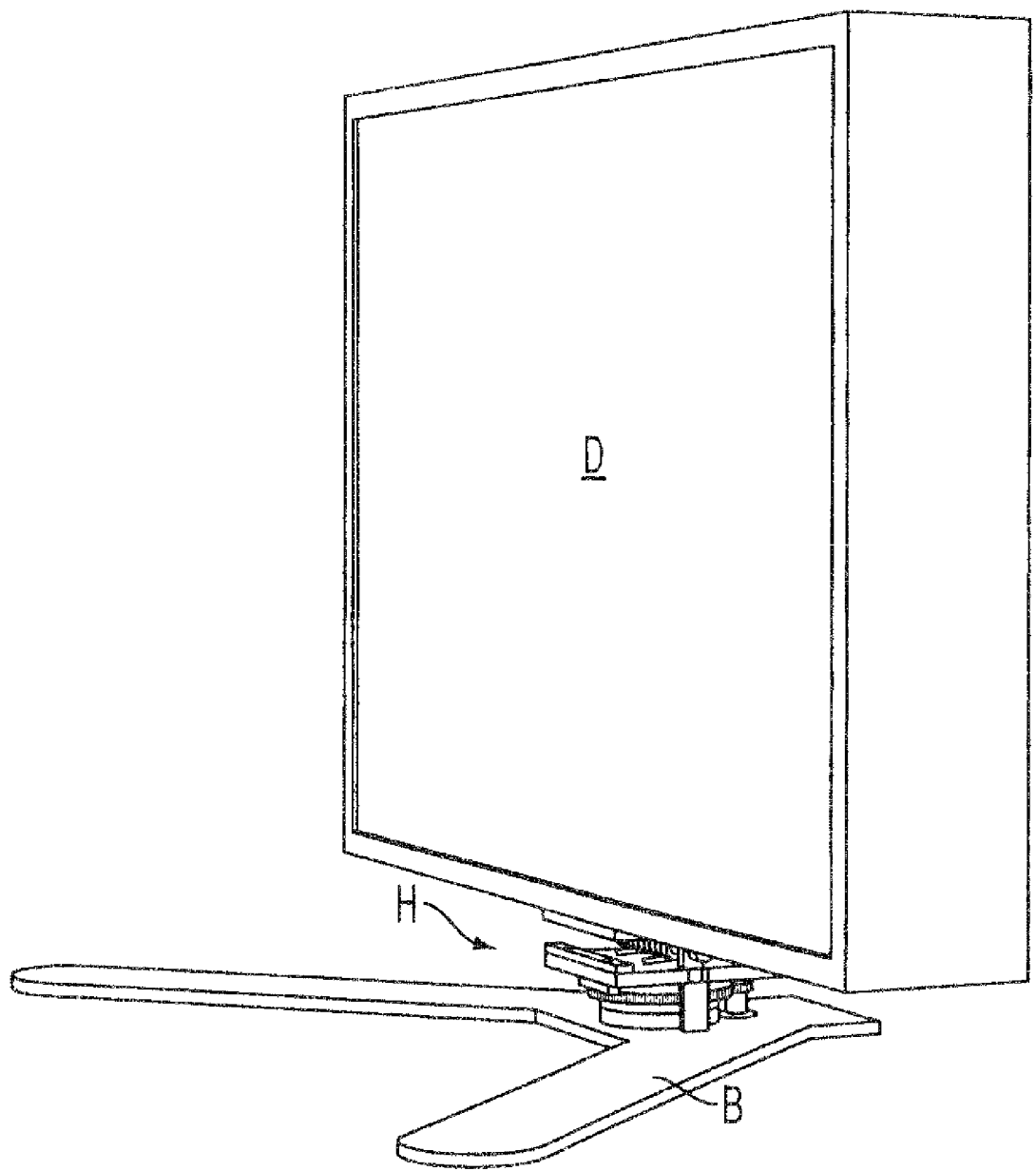
FIG. 1 is an overall perspective view of a plane display provided with a hinge device of the invention.

FIG. 1 is an overall perspective view of a plane display having thee hinge device of the invention, in which reference D is a plane display such as liquid crystal display or plasma display, and H is a hinge device for supporting the plane display D in lower part, manually rotating it in lateral horizontal direction, manually inclining (tilting, laying) in longitudinal direction, and manually elevating in vertical (height) direction. Reference B is a base plate, which stably holds the plane display D by way of the hinge device H.

Figure 2:
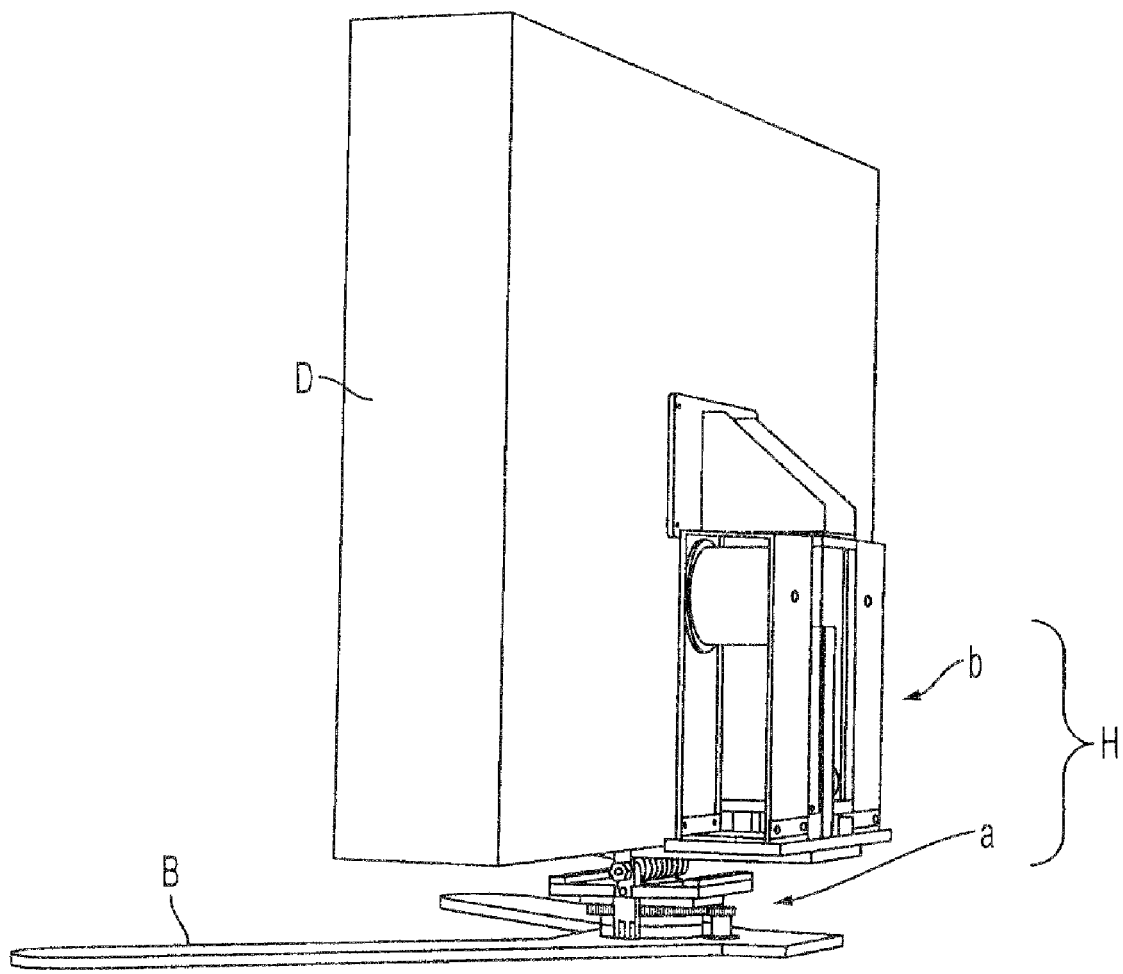
FIG. 2 is an overall perspective view as seen from an oblique reverse side of FIG. 1.
Figure 3:
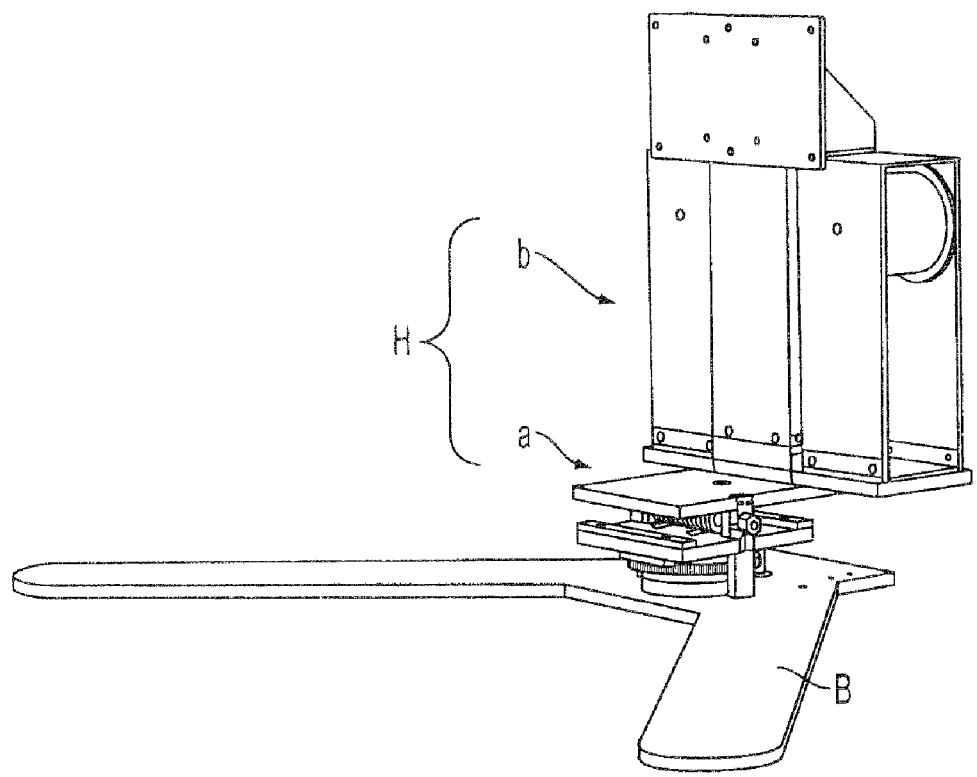
FIG. 3 is a magnified perspective view of hinge device and base plate.

As clear from FIG. 2, the hinge device H is composed of a first hinge portion (a) for rotating in lateral horizontal direction, and tilting manually also in longitudinal direction, and a second hinge portion (b) for elevating and moving in vertical direction. FIG. 3 is a magnified perspective view of the hinge device H and base plate B shown in a state after removing the plane display D.

Figure 4:
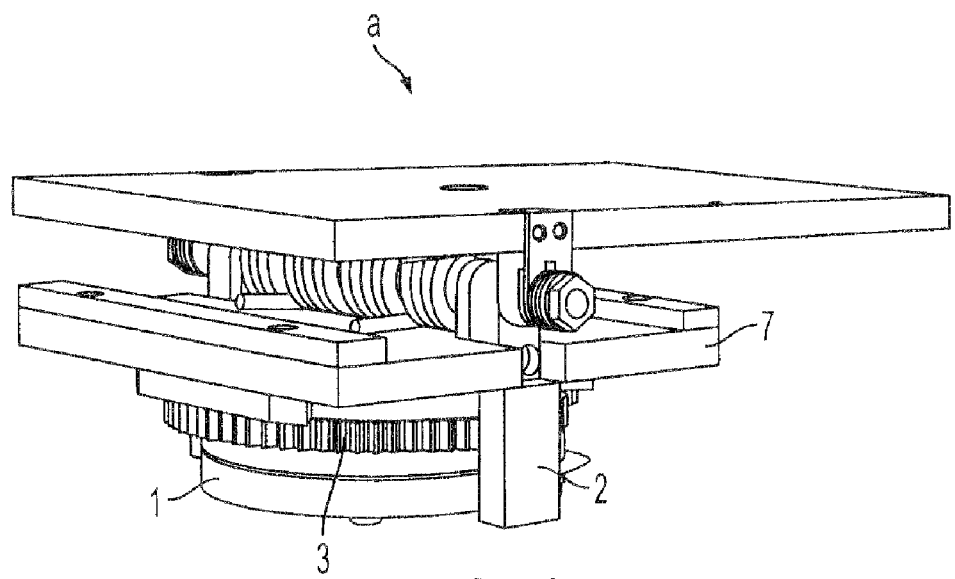
FIG. 4 is a magnified perspective view of first hinge portion.

FIG. 4 is a further magnified view of the first hinge portion (a), in which a base board 1 and a stopper 2 are attached and fixed to the base plate B (see FIG. 3). The base board 1 is provided with a working gear 3 rotatably.

Figure 5:
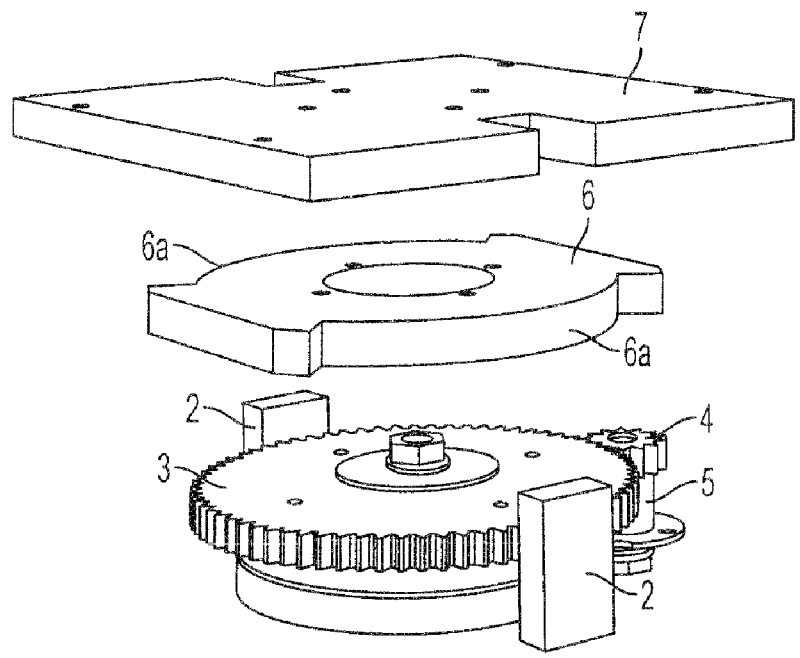
FIG. 5 is an exploded perspective view of horizontal rotation mechanism.

As clear from FIG. 5, the working gear 3 is coupled to rotational friction means 5, such as a plurality of rotational friction plates, by way of a pinion 4. Therefore, the working gear 3 is designed to stop stably at an arbitrary rotating position by means of the rotational friction means 5.

The working gear 3 is provided with a stopper plate 6. The stopper plate 6 has a notch 6a formed along a specified expected angle, and the rotational angle is defined by the stopper 2. A lateral rotary plate 7 is integrally provided and fixed on the stopper plate 6.

Figure 6:
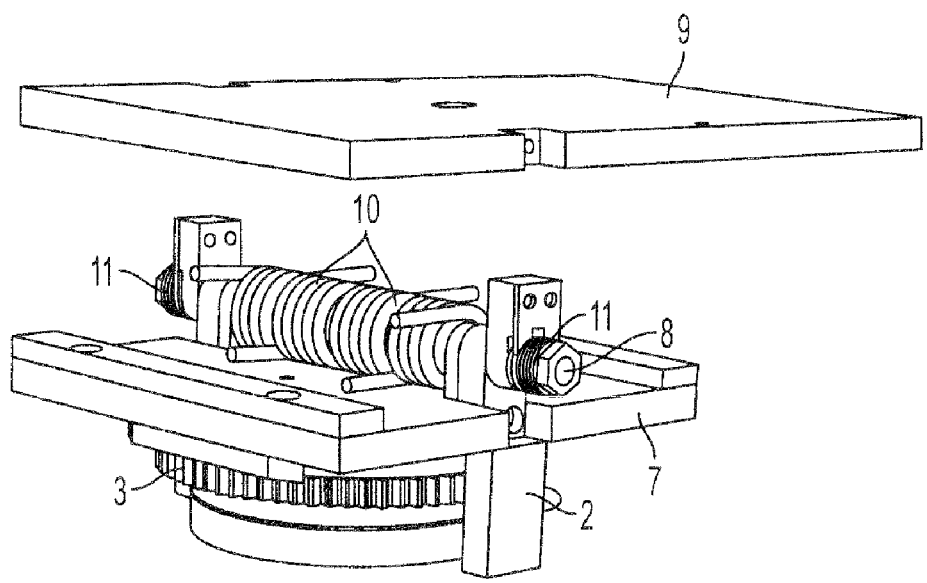
FIG. 6 is an exploded perspective view of first hinge portion.

As shown in FIG. 6, the lateral rotary plate 7 is tiltably provided with a tilting plate 9 by way of a horizontal pivot 8. As clear from FIG. 6, the horizontal pivot 8 is provided with torsion springs 10, and one end of such springs abuts against the lateral rotary plate 7, while other end abuts against the tilting plate 9. The torsion springs 10 are provided at least in one pair (two pairs in the embodiment), and are mutually reversed in the torsion direction. The horizontal pivot 8 is provided with friction means 11 composed of a plurality of friction plates. Therefore, the tilting plate 9 is designed to tilt manually and easily by the torsion springs 10, and to stop stably at an arbitrary tilting position by the friction means 11.

Figure 7:
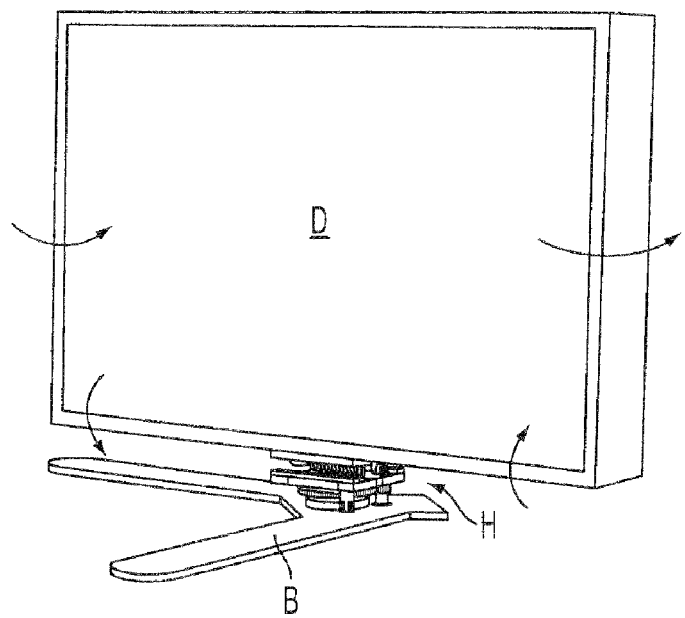
FIG. 7 is an overall perspective view of plane display manually rotated in left horizontal direction.
Figure 8:
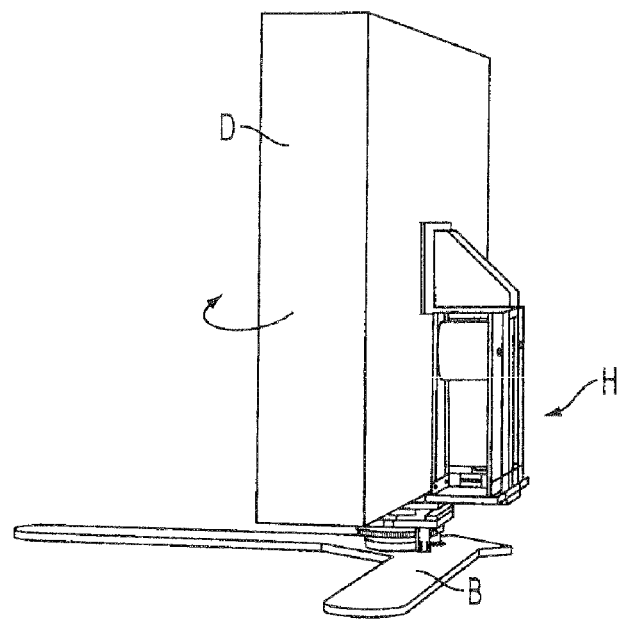
FIG. 8 is an overall perspective view of plane display manually rotated in right horizontal direction.
Figure 9:
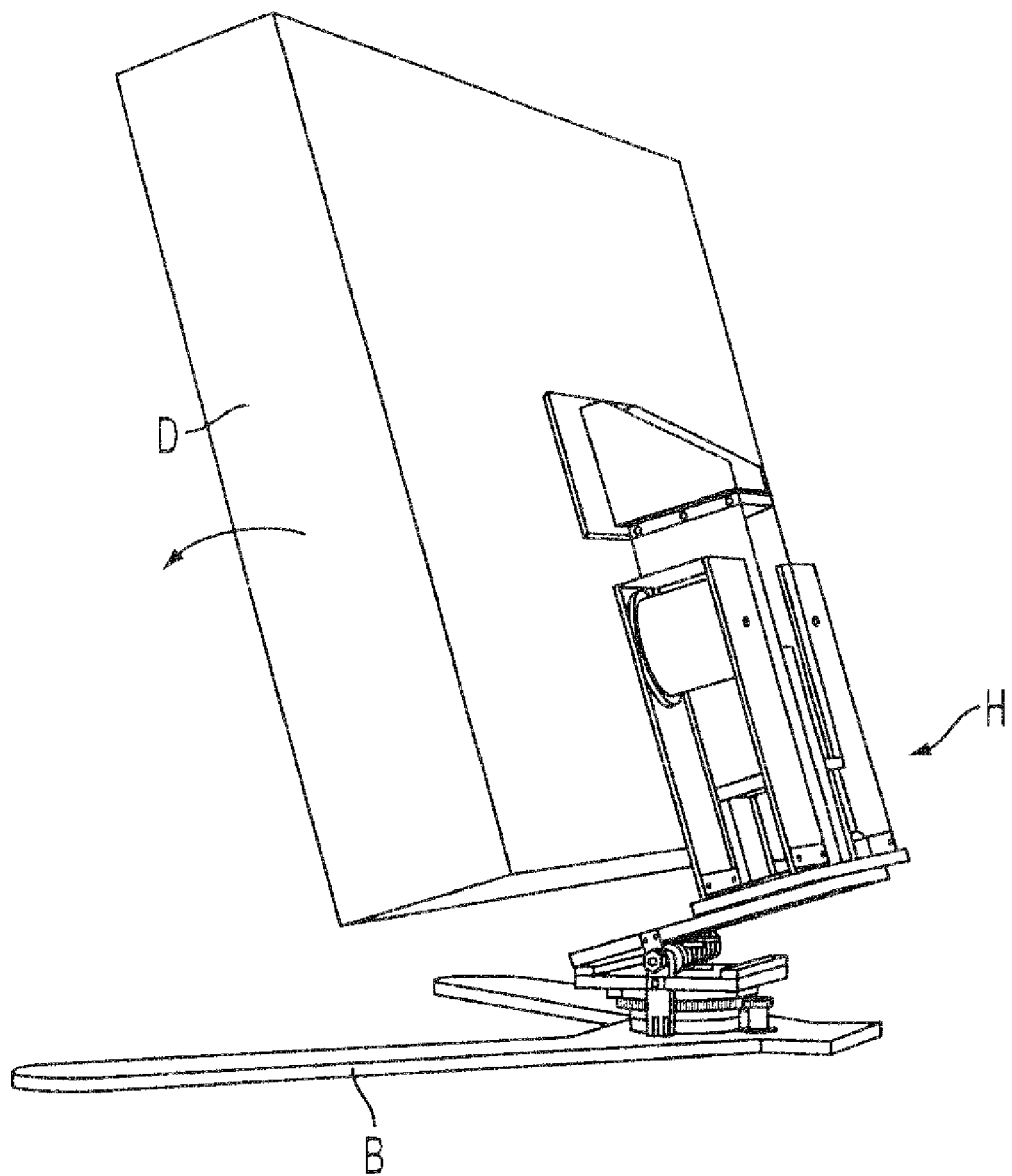
FIG. 9 is an overall perspective view of plane display manually tilted in front direction.
Figure 10:
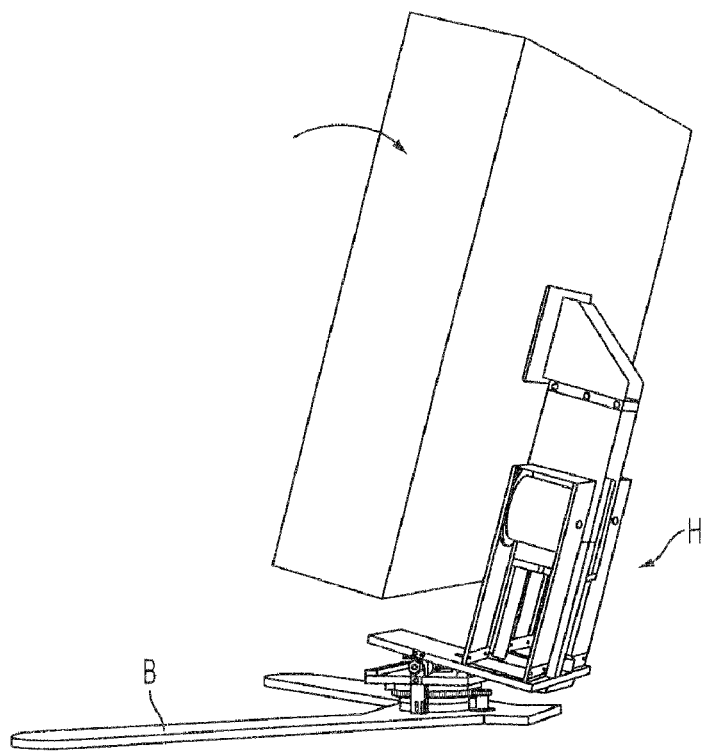
FIG. 10 is an overall perspective view of plane display manually tilted in rear direction.

By the first hinge portion (a), the plane display D is manually rotated in lateral horizontal direction as shown in FIG. 7 and FIG. 8, and is stopped stably at an arbitrary horizontal rotation position, or as shown in FIG. 9 and FIG. 10, the plane display D is manually tilted (laid) in longitudinal direction, and is stopped stably at an arbitrary tilting position.

Figure 11:
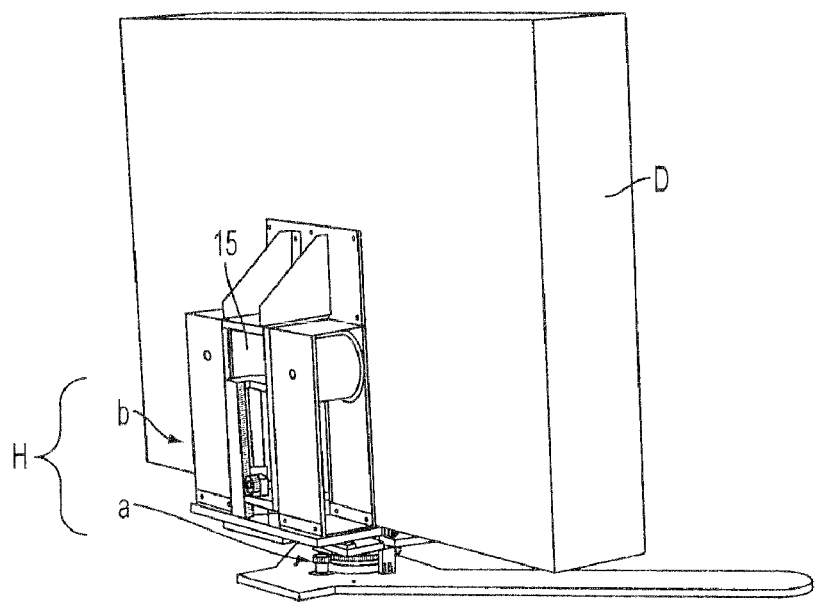
FIG. 11 is an overall perspective view of plane display showing second hinge portion.
Figure 12:
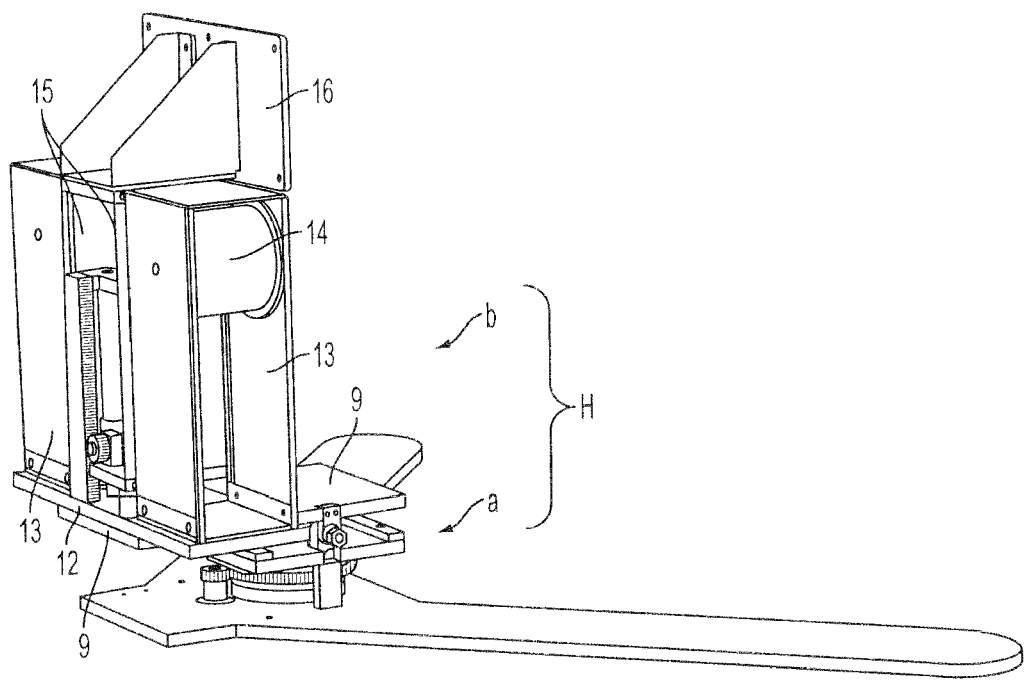
FIG. 12 is a magnified perspective view of second hinge portion.

As clear from FIG. 11 and FIG. 12, on the tilting plate 9 of the second hinge portion (b), a vertical base plate 12 of the second hinge portion (b) is mounted and fixed. The vertical base plate 12 is provided with guide frames 13 at right and left positions. Constant load spring cone stones 14 are rotatably mounted in the upper part of the guide frames 13.

Figure 13:
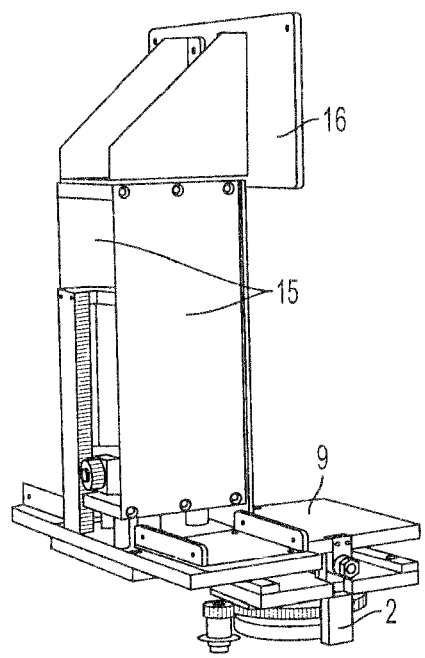
FIG. 13 is a perspective view of essential parts in FIG. 12.

Between the right and left guide frames 13, a vertical slide frame 15 (see also FIG. 13) is inserted, and the leading ends of the right and left constant load spring cone stones 14 are fixed in lower part of the frame 15 and suspended in a vertically movable manner. At the upper end of the vertical slide frame 15, a display mounting frame 16 for mounting and fixing the plane display D is provided.

Figure 14:
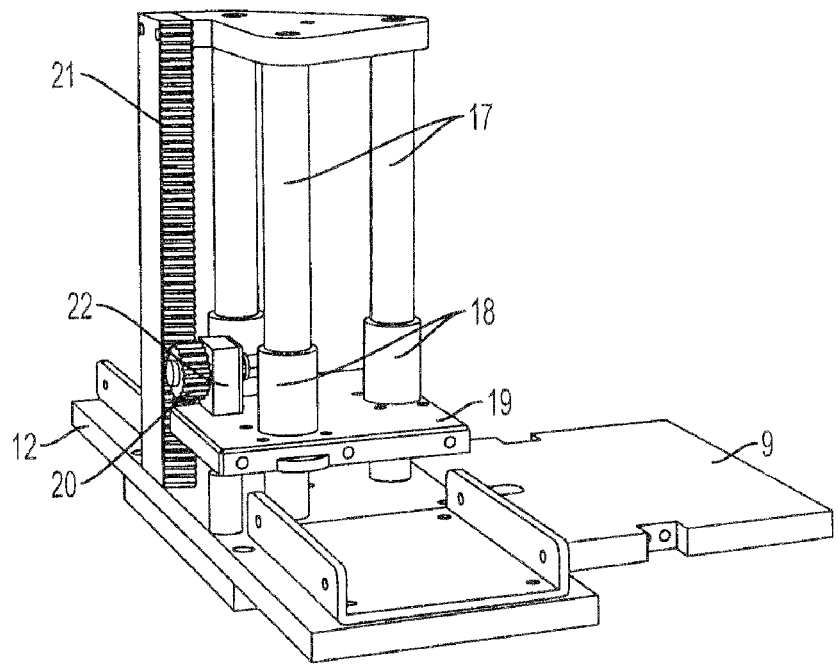
FIG. 14 is an operation explanatory diagram of second hinge portion.

FIG. 14 is a diagram for explaining the vertical moving (sliding) mechanism, in which a proper number of (three in this embodiment) posts 17 are planted on the vertical base plate 12. In these posts, slide sleeves 18 are externally inserted in vertical sliding state. The slide sleeves 18 are provided with a vertical moving plate 19. A pinion 20 is rotatably provided in the vertical moving plate 19. The pinion 20 is engaged with a perpendicular rack 21. The rack 21 is planted and fixed on the vertical base plate 12. Therefore, along with the vertical movement of the vertical moving plate 19, the pinion 20 rolls along the perpendicular rack 21. Rotation of the pinion 20 is defined by rotation friction means 22 composed of, for example, a plurality of rotational friction plates, and the pinion 20 may be stably stopped at an arbitrary perpendicular position of the perpendicular rack 21.

Figure 15:
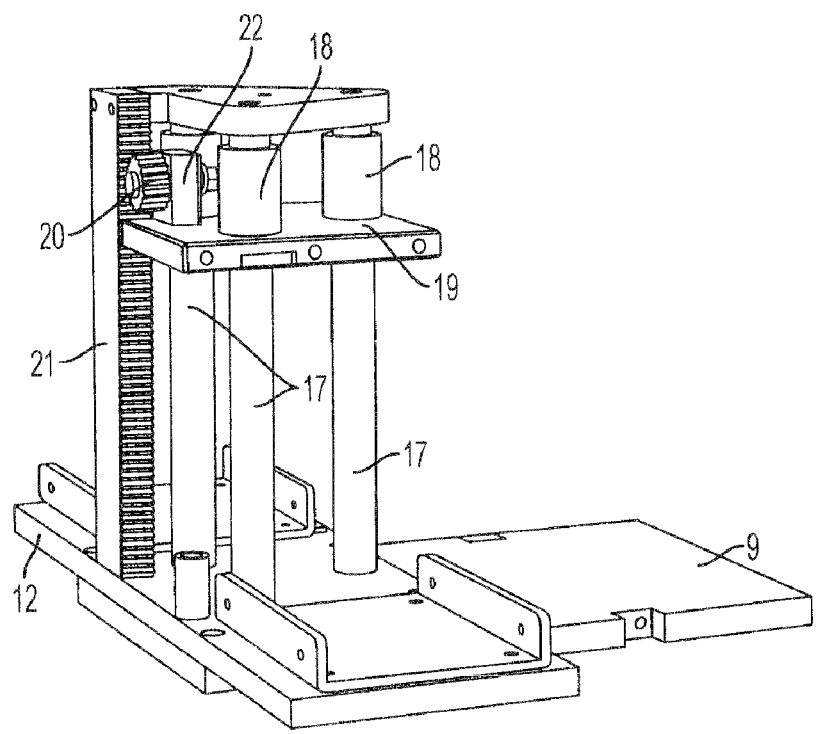
FIG. 15 is an operation explanatory diagram of second hinge portion.
Figure 16:
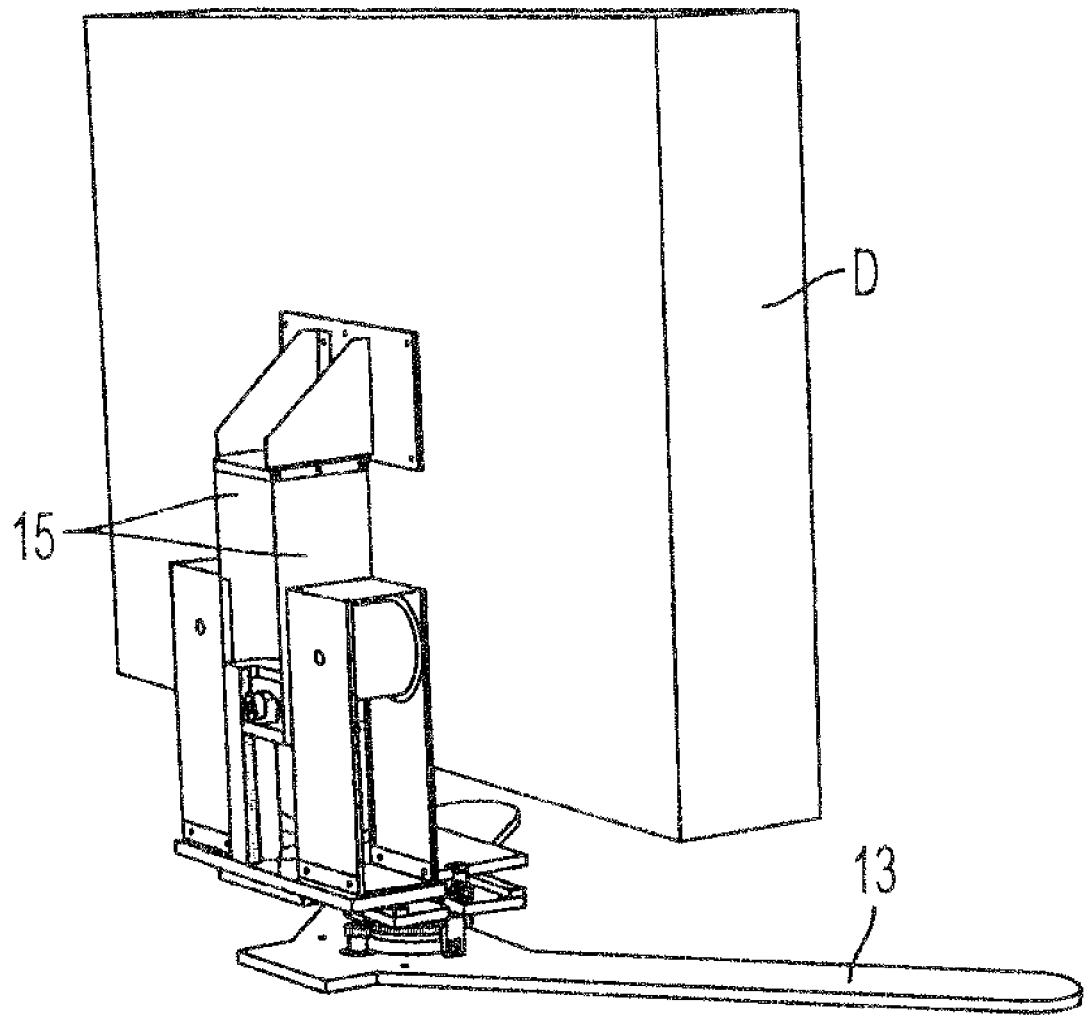
FIG. 16 is an overall perspective view of elevated state of plane display.

FIG. 15 and FIG. 16 show an elevated state of plane display D by elevation of the vertical moving plate 19.

The embodiment includes individual mechanisms for rotating horizontally, tilting longitudinally, and elevating vertically, but may be realized by a single mechanism or a combination of two mechanisms. For example, in the case of horizontal rotating mechanism only, the lateral rotating plate 7 is directly connected to the plane display D. In the case of combination of horizontal rotating and longitudinal tilting mechanisms, the tilting plate 9 is directly connected to the plane display D. In the case of longitudinal tilting mechanism only, the lower horizontal rotating mechanism of the lateral rotating plate 7 is omitted, and directly connected to the base plate B, and the tilting plate 9 is directly connected to the plane display D. In the case of combination of longitudinal tilting and vertical elevating mechanisms, the lower horizontal rotating mechanism of the lateral rotating plate 7 is omitted, and directly connected to the base plate B. In the case of vertical elevating mechanism only, the lower mechanism of the tilting plate 9 is omitted, and directly connected to the base plate B.

DESCRIPTION OF THE REFERENCE NUMERALS a First hinge portion
b Second hinge portion
1 Base board
2 Stopper
3 Working gear
4 Pinion
5 Rotation friction means
6 Stopper plate
6a Notch
7 Lateral rotation plate
8 Horizontal pivot
9 Tilting plate
10 Torsion spring
11 Friction means
12 Vertical base plate
13 Guide frame
14 Constant load spring cone stone
15 Vertical slide frame
16 Display mounting frame
17 Post
18 Slide sleeve
19 Vertical moving plate
20 Pinion
21 Perpendicular rack
22 Rotation friction means
B Base plate
D Plane display
H Hinge device

We claim:

1. A hinge device of a plane display comprising a first mechanism for supporting the plane display at a lower portion thereof, and a second mechanism for rotating the plane display manually in a lateral horizontal direction, wherein the second mechanism includes a horizontal rotary position holding device comprising rotational friction plates, and a transmitting mechanism for transmitting rotary motion in a lateral horizontal direction of the plane display to the horizontal rotary position holding device, the transmitting mechanism comprising a working gear and a pinion operatively connected to the working gear to provide the rotation of the plane display in the horizontal direction.

2. The hinge device of a plane display of claim 1, further comprising two stoppers disposed opposing one another with the working gear therebetween, a stopper plate operatively connected to the working gear, the stopper plate having protrusions configured to come into contact with the stoppers, wherein the rotary movement in the lateral horizontal direction is limited when the protrusions come into contact with the stoppers due to rotational movement of the stopper plate.

3. A hinge device of a plane display comprising a first mechanism for supporting the plane display at a lower portion therefor, and a second mechanism for tilting of the plane display manually in a longitudinal direction, wherein the second mechanism includes a longitudinal tilting position holding device comprising a plurality of friction plates, and a first transmitting mechanism for transmitting longitudinal tilting motion of the plane display to the longitudinal tilting position holding device, the first transmitting mechanism comprising a tilting plate on which the plane display sits, a horizontal pivot connected to the plurality of friction plates such that the plurality of friction plates limit the pivoting movement of the horizontal pivot, and at least one pair of torsion springs connected to the horizontal pivot for controlling the tilting movement of the plane display.

4. The hinge device of a plane display of claim 3, wherein the first mechanism for supporting the plane display further comprises a rotary mechanism for rotating the plane display in a lateral horizontal direction, the rotary mechanism including a horizontal rotary position holding device comprising rotational friction plates, and a second transmitting mechanism for transmitting rotary motion in the lateral horizontal direction of the plane display to the horizontal rotary position holding device, the second transmitting mechanism comprising a working gear and a pinion operatively connected to the working gear to provide the rotation of the plane display in the lateral horizontal direction.

5. The hinge device of a plane display of claim 3, wherein the at least one pair of torsion springs provided on the horizontal pivot, are disposed between the tilting plate and a lateral rotary plate disposed on a stopper plate on a side opposite from a working gear, the pair of torsion springs arranged mutually reversed in a torsion direction.

6. A hinge device of a plane display comprising a first mechanism for supporting the plane display at a lower portion thereof, and a second mechanism for elevating the plane display manually in a vertical direction, wherein the second mechanism includes an elevating position holding device comprising rotational friction plates, and a first transmitting mechanism for transmitting elevating motion of the plane display to the elevating position holding device, the first transmitting mechanism comprising a display mounting frame attached to a rear side of the plane display, a vertical moving plate attached to the display mounting frame, a pinion rotatably provided on the vertical moving plate, and a rack extending upwardly from a vertical base plate, engaged with the pinion, and coupled to the rotational friction plates.

7. The hinge device of claim 6, further comprising:
a plurality of posts disposed on the vertical base plate;
a plurality of slide sleeves, each slide sleeve disposed to slidably move along one of the posts, said slide sleeves disposed to rest on said vertical moving plate and move along the posts as the vertical moving plate is moved by the first transmitting mechanism,
wherein the plane display is operatively connected to the vertical moving plate and is moved in the vertical direction by movement of the vertical movement plate.

8. The hinge device of claim 6, wherein the first mechanism for supporting the plane display comprises:
a tilting mechanism for tilting the plane display manually in a longitudinal direction, wherein the tilting mechanism includes a longitudinal tilting position holding device comprising a plurality of second friction plates, and a second transmitting mechanism for transmitting longitudinal tilting motion of the plane display to the longitudinal tilting position holding device, the second transmitting mechanism comprising a tilting plate on which the plane display sits, a horizontal pivot connected to the plurality of second friction plates such that the plurality of second friction plates limit the pivoting movement of the horizontal pivot, and at least one pair of torsion springs connected to the horizontal pivot for controlling the tilting movement of the plane display; and
a rotary mechanism for rotating the plane display in a lateral horizontal direction, the rotary mechanism including a horizontal rotary position holding device comprising third rotational friction plates, and a third transmitting mechanism for transmitting rotary motion in the lateral horizontal direction of the plane display to the horizontal rotary position holding device, the third transmitting mechanism comprising a working gear and a pinion operatively connected to the working gear to provide the rotation of the plane display in the lateral horizontal direction.

* * * * *